United States Patent [19]

Sixsmith

[11] Patent Number: 4,958,857
[45] Date of Patent: Sep. 25, 1990

[54] WELDING SEAL ASSEMBLY

[75] Inventor: Thomas G. Sixsmith, El Toro, Calif.

[73] Assignee: R&G Sloane Manufacturing Co., Sun Valley, Calif.

[21] Appl. No.: 304,327

[22] Filed: Jan. 30, 1989

[51] Int. Cl.⁵ .......................... F16L 13/02; F16L 47/02
[52] U.S. Cl. ...................................... 285/21; 285/331; 285/236; 285/253; 219/544
[58] Field of Search .................. 285/331, 21, 236, 253; 219/544

[56] References Cited

U.S. PATENT DOCUMENTS

| | | | |
|---|---|---|---|
| 2,447,697 | 8/1948 | Gotschall | 285/331 X |
| 3,408,091 | 10/1968 | Zylstra | 285/253 X |
| 3,465,126 | 9/1969 | Blumenkranz | 219/482 |
| 3,506,519 | 4/1970 | Blumenkranz | 219/544 X |
| 3,788,928 | 1/1974 | Wise | 285/21 X |
| 4,191,407 | 3/1980 | Bretone, Jr. | 285/331 X |
| 4,763,932 | 8/1988 | Matz et al. | 285/331 X |

Primary Examiner—Dave W. Arola
Assistant Examiner—Carol I. Bordas

[57] ABSTRACT

A welding seal assembly for use in joining and sealing two telescoped tubular elements in a lap joint, specifically a tubular pipe in a pipe socket formed in a pipe fitting. The seal assembly comprises a thermoplastic welding sleeve with an embedded electric heating coil for fitting between the pipe and the socket; a mounting collar including a ring-like body that is fitted over the pipe and against the end of the socket element with a thin-walled, compressible flange extending from the body over the outer side of the socket element and overlying the overlapped elements of the joint; an electrical connector in a radially projecting tab on the ring, including electrical contacts connected to the leads of the heating coil; and a clamp ring surrounding the compressible flange and held captive thereon between the tab on the body and detents on the flange. The clamp ring has an outwardly offset section on one side providing generally radial walls that are squeezed together to contract the clamp ring and compress the flange around the joint. The collar, flange and socket tab are injection-molded with the welding sleeve and the embedded coil as mold inserts, and the end of the welding sleeve is bonded to the collar in the molding process.

22 Claims, 1 Drawing Sheet

U.S. Patent    Sep. 25, 1990    4,958,857
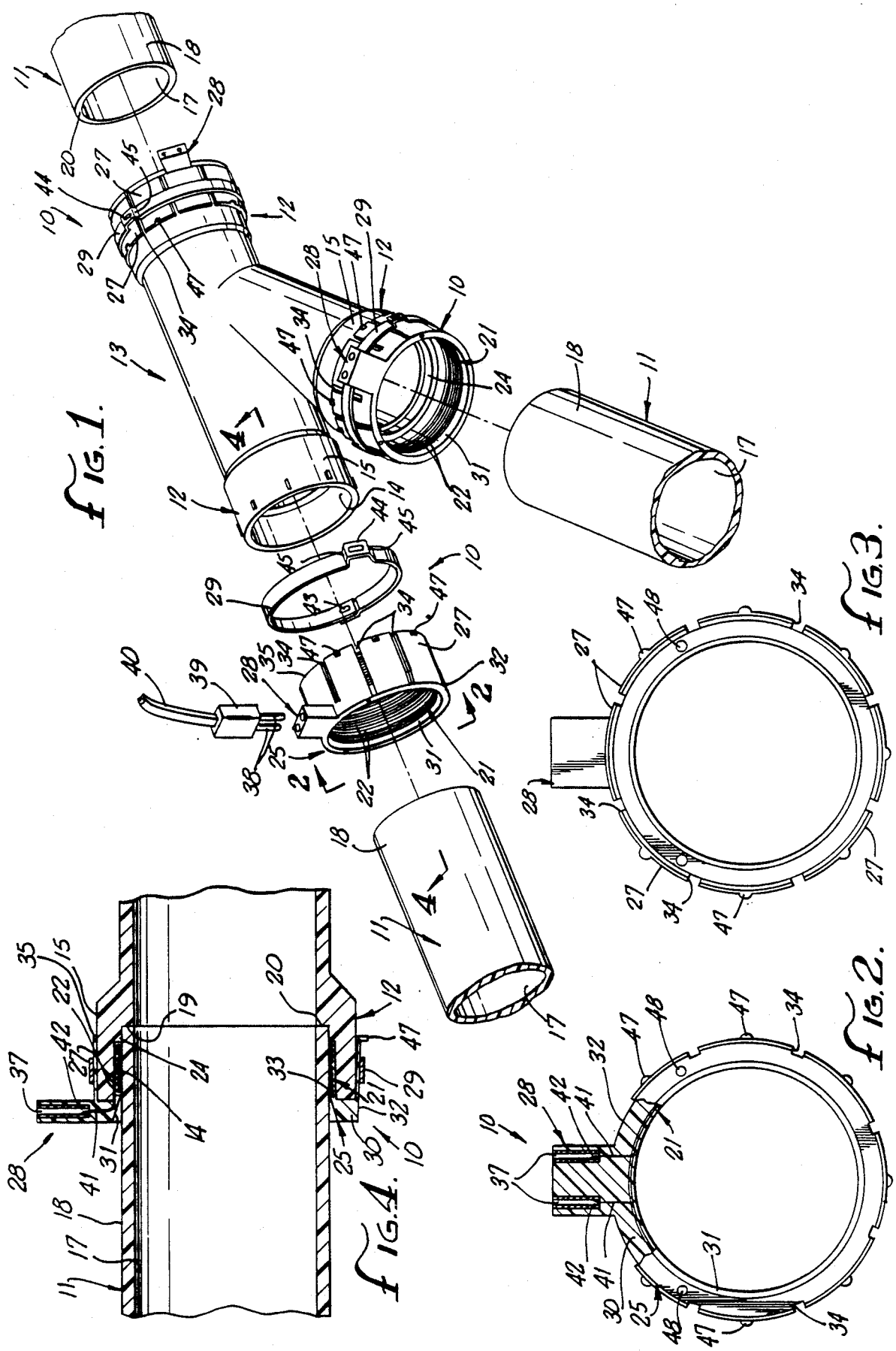

WELDING SEAL ASSEMBLY

BACKGROUND OF THE INVENTION

This invention relates generally to the joining of interfitting elements, and has more particular reference to the joining and sealing of telescoped tubular elements such as pipes and pipe sockets that are composed of thermoplastic material and joined together in an electrical welding or fusion process.

A well known predecessor of this invention is disclosed in U.S. Pat. No. 3,506,519, in which a welding sleeve of thermoplastic resin, having a coil of electrical resistance wire embedded in the resin, is clamped in a pipe joint between an outer, socket element of the joint and an inner element in the form of a pipe that is fitted into the socket element. The ends of the wire forming the heating coil extend out of the joint for connection to a power source, for example, as in U.S. Pat. No. 3,465,126. During the fusion process, the joint is squeezed by a clamp that is applied to the joint around the telescoped elements and tightened to squeeze the elements together during fusion.

As explained in U.S. Pat. No. 3,506,519, this electrical welding process fuses the elements of the joint while they are held in intimate contact, and restrains the articles against thermal expansion, as well as compensating for certain mismatches in size. Most importantly, this process joins the articles together in a homogeneous structure that provides a secure, leakproof joint.

SUMMARY OF THE INVENTION

The present invention resides in an improved welding seal assembly that retains all of the advantages of the prior welding sleeve of U.S. Pat. No. 3,506,519 and, in addition, greatly facilitates the handling of the parts during assembly of joint to be welded for more effective operation and substantial savings in time and labor. To these ends, the welding sleeve is combined with a mounting collar in a unitary cap-like element that is fitted over the socket element of the joint and holds the welding sleeve in its proper position therein, and the leads constituting the ends of the heating coil are connected to a quick-connect/disconnect electrical socket on the collar, for more convenient connection to a power source. In addition, the collar has a compressible flange that overlies the welding sleeve in coaxial relation with it, cooperating with the sleeve in forming an annular seat for receiving the end of the socket element, and a clamp ring extends around this flange and includes means for adjusting its size from a loose condition to a tightened condition, thereby to squeeze the telescoped elements of the joint together during welding. This ring is pre-installed on the flange and is held captive thereon between opposed detent abutments, eliminating the need for separate installation. Each collar preferably has a dedicated ring that remains in place on the joint, holding the joint tightly together as it cools and eliminating the need for removal.

More detailed aspects of the invention include the formation of the electrical socket in a radial tab on one side of the collar that can be positioned as desired on any side of the joint for convenient access; the formation of flange as a thin-walled skirt that is interrupted at intervals for ease of flexing; the use of a clamp ring having tightening means on the clamp ring in the form of opposed, generally radial walls of an outwardly offset section of the ring that is easily gripped and squeezed in pliers to contract the ring around the joint; and the bonding of the welding sleeve at one end into a collar-and-sleeve unit as an incident to the molding of the collar.

Other aspects and advantages of the invention will become apparent from the following detailed description, taken in conjunction with the accompanying drawings.

BRIEF DESCRIPTION OF THE DRAWINGS

FIG. 1 is a partially exploded perspective view of a three-way pipe fitting and partial sections of three pipes to be connected by the fitting, with three welding seal assemblies that embody the novel features of the present invention, two of the assemblies being installed on the fitting and the third being shown in exploded perspective with a plug connector of an electrical power unit;

FIG. 2 is an end elevational view of one of the collar-and-sleeve units of FIG. 1, shown on an enlarged scale, the view being taken in the direction of the arrow 2 in FIG. 1 and being partially broken away and shown in cross-section, this end sometimes being referred to herein as the front end;

FIG. 3 is an end elevational view of the collar-and-sleeve unit in FIG. 2, taken from the opposite end, sometimes referred to herein as the rear end; and FIG. 4 is an enlarged fragmentary cross-sectional view taken substantially along line 4—4 of FIG. 1, with the parts assembled and shown on the same scale as FIGS. 2 and 3.

DETAILED DESCRIPTION

As shown in the drawings for purposes of illustration, the invention is embodied in a welding seal assembly, indicated generally by the reference number 10 in FIGS. 1 and 4, for use in joining and sealing telescoped tubular elements, such as a pipe element 11 in a pipe socket element 12, in a joint of the type sometimes referred to as a lap joint, wherein the two telescoping tubular elements overlap. In the illustrative embodiment shown in FIGS. 1 and 4, three pipes 11 are received in three socket elements 12 of a Y-shaped pipe fitting 13, two of the pipes being joined in an in-line relationship and the third being joined at an acute angle.

The pipe fitting 13 is of a conventional configuration, having a straight section with two sockets at its opposite ends and a branch section with another socket at its one open end. Each socket is defined in an enlarged end portion or "bell" that has inside and outside surfaces 14 and 15, respectively, (see FIG. 4) that are larger in diameter than the inside and outside surfaces 17 and 18, respectively, of the pipes. Each socket also has an internal shoulder 19 between the larger and smaller inside diameters of the fitting, this shoulder constituting the "bottom" of the socket against which the inner end 20 of a pipe 11 abuts when it is inserted fully into the socket. It should be noted that the same basic structure can be used when two pipe sections are joined together in end-to-end relation, one end of such a pipe (not shown) being "belled" to form a socket therein.

Pipes and fittings of this type are used for a wide variety of purposes, ranging from common plumbing systems to corrosive waste systems. Most frequently, the pipes and fittings are composed of a thermoplastic polymer such as flame retardant polypropylene, which is rugged, durable and highly resistant to corrosive waste.

As explained in the U.S. Pat. No. 3,506,519, it has been conventional practice to seal the joints in such a system by positioning a welding sleeve of thermoplastic resin between the telescoped pipe and socket elements and fusing the welding sleeve and the surrounding portions of the pipe and socket elements by passing an electric current through a heating coil that is embedded or encased in the sleeve. Further, it has been conventional to apply external pressure to the elements to insure intimate engagement during the heating of the thermoplastic material and its subsequent cooling.

In accordance with prior practice, a welding sleeve 21 herein is disposed in each joint, between the inside surface 14 of the socket element and the outside surface 18 of the pipe. As in the past, the welding sleeve comprises a tubular body of suitable thermoplastic material for the particular pipe joint, typically polypropylene, with a heating coil 22 of electrical resistance wire embedded in the sleeve to produce sufficient heat, when electrically energized, to fuse the elements of joint together. As shown in FIG. 4, the socket element 12 has an outer portion that is of slightly enlarged diameter, ending at a small internal shoulder 24 that is spaced forwardly or outwardly (to the left in FIG. 4) from the shoulder 19. The diameter of the enlarged portion in front of this shoulder exceeds the outside diameter of the pipe by an amount sufficient to receive the welding sleeve in the socket around the pipe with a close sliding fit. The small shoulder 24 is spaced from the outer end of the socket by at least the length of the welding sleeve 21. Thus, the shoulder engages the inner end of the welding sleeve to position the sleeve in the socket preparatory to the fusing operation.

In the past, in practicing the method described in U.S. Pat. No. 3,506,519, it has been necessary to place the welding sleeve on the pipe or in the socket element before bringing the two parts together, taking care to maintain the electrical leads from the heating coil in proper position for access and connection to a power unit (not shown). It also has been necessary to fit a clamping device such as the screw clamp (not shown herein) described in the patent, over the joint, and to tighten the clamp until the pipe was secured in the socket, again taking care to maintain the electrical leads in position for connection to the power unit. When all of the various elements were installed, tightened and connected, the power unit was energized to complete the fusion process, after which the joint was allowed to cool and the clamp was removed.

In accordance with the present invention, the welding sleeve 21 is incorporated in a novel welding seal assembly 10 that includes a mounting collar 25 for positioning and holding the sleeve properly in the socket element 12 ready to receive the end of a pipe 11, and includes a compressible flange 27 for use in squeezing the parts together during the welding process. An electrical connector 28 on the collar can be positioned in different selected locations about the joint for ease of access and is connected to the leads of the coil 22 to protect them as well as to facilitate the connecting and disconnecting operations. In addition, a simple and inexpensive clamp 29 is incorporated in the assembly, preferably as a captive element that is installed on the joint as a part of the assembly 10, and remains in place after the fusion process is complete.

As illustrated in the preferred embodiment of the invention that is shown herein, the mounting collar 25 of the assembly 10 has a ring-like body 30 (see FIG. 4) that lies against the end of the socket element 12 with an inside surface 31 forming an opening for admitting the pipe 11 into the socket. This opening preferably is a bevel facilitating insertion of the pipe. The outside surface 32 of the collar body is slightly larger than the outside surface 15 of the socket element, and the compressible flange 27 on the collar extends to the rear (the right in FIG. 4) from the body 30 across the socket element to overlie the overlapped portions of the pipe and the socket element.

More specifically, the preferred mounting collar 25 herein is a one-piece plastic molding to which the welding sleeve 21 is joined as an incident to the molding process. As can be seen in FIG. 4, the welding sleeve abuts at its front end (the left end in FIG. 4) against an internal shoulder 33 on the body 30, in a position that is substantially flush with the inner end of the inside opening 31 in the body, at the inner end of the bevel. The compressible flange 27 extends to the right from the outer surface of the collar body, substantially flush with that surface and coaxial with the welding sleeve 21. The flange is integral with the body and thin-walled so as to be radially flexible, and also is peripherally interrupted at intervals around the flange by slots 34 (see FIG. 1) which preferably are spaced at equal intervals and extend entirely across the flange from the body to the free rear edge 35. In effect, the flange is divided into a plurality of flexible fingers overlying the welding sleeve.

The electrical connector 28 is formed as a radial tab on the collar 25 having two parallel bores 37 that open outwardly through the end of the tab to form an electrical socket for receiving parallel prongs 38 of an electrical plug, connected by a two-wire conductor 40 to the power unit. The bores are lined with electrically conductive material, such as tubular copper contacts, and are conductively joined to the leads 41 of the coil. As shown in FIGS. 2 and 4, these leads herein extend from the sleeve 21 into and through the body 30 of the collar to the contacts, and are soldered thereto at 42.

A collar-and-sleeve unit of this type can be produced in a two-step molding process, first molding the coil 22 in the welding sleeve with both leads 41 projecting from one end of the sleeve, and then forming the collar 25 in an injection molding process with the welding sleeve and the embedded coil set in the mold as inserts. In this way, the collar, including the tab 28 and the flange 27, can be injection molded in one piece around the inserts. The end of the welding coil that abuts against the shoulder 33 on the body of the collar is bonded and heat-sealed to the collar in this process, with the leads of the coil extending through the body to the electrical contacts in the bores 37.

The clamp 29 of the welding seal assembly 10 is a metal band that loosely encircles the compressible flange 27 and has means thereon for contracting the band around the flange and thereby squeezing the elements of the joint. The illustrative clamp has overlapped ends that are pinned together at 43, effectively into a permanent circle, and the means for contracting the band comprise an outward offset of a small section 44 of the band, bounded by two generally radial walls, or lugs 45, that can be squeezed together with conventional "pincher" pliers (not shown) to contract the band. A clamp of this type is sold by Oetiker, Marquette, Mich.

To facilitate the installation of the clamp 29 on a pipe joint, the flange 27 of the collar 25 has detent abutments 47 along with the free rear edge 35 that cooperate in holding the clamp captive in the free, unflexed condition of the flange. These detent abutments are a series of small integral tabs or bumps that are molded on the flange adjacent the rear edge thereof, the tabs projecting outwardly farther than the inside diameter of the clamp ring. The electrical socket 28 forms an opposed detent abutment preventing sliding of the clamp off the front side of the collar.

Such a clamp is easily installed on a collar-and-sleeve unit, either during the manufacturing process or preparatory to use of the assembly on a pipe joint, simply by compressing the flange 27 to a size small enough to receive a clamp. When released, the flange expands to its normal size as a result of the inherent resilience of the polypropylene, and the clamp thereafter is held in operative position on the flange. In this condition, the clamp loosely encircles the flange, and can be turned to locate the tightening section 44 in any desired angular position.

When two or more pipes are to be joined and sealed together with such a welding seal assembly 10 in accordance with the present invention, one assembly is provided for each pair of pipe and socket elements 11 and 12 that are to be joined and sealed. While the manner of operation should be readily apparent from the foregoing description, a summary of the operation will contribute to a full appreciation of the invention. It is to be understood that the socket element 12 may be formed in one end of a length of pipe as well as in a pipe fitting 13 as disclosed herein.

Beginning with separated pipe and socket elements to be joined and sealed and with a welding seal assembly 10 of the proper size for the pipe and pipe socket elements, the usual first step is to fit the welding sleeve assembly over the end of the pipe socket, with a clamp 29 in place on the collar flange 27, slipping the welding sleeve 21 into the socket element along the inner wall 14 thereof and slipping the flange 27 over the socket element along the outer wall 15 thereof. The components of the welding seal assembly are sized to slide into position with a free sliding fit, despite variations in size that occur in pipes and pipe fittings within allowable tolerances.

The inner, or rear, end of the welding sleeve 21 will engage the small shoulder 24 as the outer end of the socket element engages the body 30 of the collar, the socket element being fully seated in the annular seat that is defined between the collar and the welding sleeve. Then the pipe is inserted into the socket, through the beveled opening 31 in the body of the collar, and slides along the sleeve until the end of the pipe engages the shoulder 19 at the bottom of the socket. At this point, the joint is ready to be welded and sealed.

To complete the joint, all that is necessary is electrical current, which is provided by "plugging" the pronged connector 39 into the bores 37 in the electrical socket formed in the tab 28. The tab, of course, can be turned easily into the position that is the most convenient for receiving the connector. The actual energization of the coil can be controlled in accordance with the prior art, using a power unit (not shown) of the general type that is described in U.S. Pat. No. 3,465,126.

The application of clamping pressure is an extremely simple matter with the improved welding seal assembly 10. The walls 45 of the offset section 44 are gripped in a set of pincher pliers and squeezed at the appropriate time in the process, thereby compressing the compressible flange 27 around the joint. If desired, this clamping can be done preliminarily when the pipe and socket are together, and again during heating, to insure application of full pressure to the joint. After the heating cycle is complete, the electrical connector 39 simply is unplugged from the tab 28 and the operation is complete.

To provide a visual indication that fusion has occurred, one or more small passages 48 may be formed in the mounting collar 25 to extend into the space where the sleeve is held, to form "weep" holes for the escape of small amounts of the molten plastic under the pressure of the clamp. This provides a positive indication that a good electrical connection has been made and that the plastic has, in fact, melted.

It will be apparent that the installation of the welding sleeve 21, the handling of the leads 41 of the heating coil 21 and the installation and operation of the clamp 29 are significantly simplified as compared to the corresponding steps used in the method described in U.S. Pat. No. 3,506,519. The entire assembly operation is greatly facilitated for significant savings in time and labor, and the operation is made virtually foolproof.

It also will be apparent that, while one specific embodiment of the invention has been illustrated and described, various modifications and changes may be made by those skilled in the art without departing from the spirit and scope of the invention.

I claim as my invention:

1. For use in a joint comprising a pipe and a socket element composed of thermoplastic material and telescoped together with the pipe within the socket element, an improved welding seal assembly comprising:

a welding sleeve of thermoplastic material to be disposed between the pipe and the socket element and having an embedded electrical heating coil, said sleeve having an inside diameter sized to receive the pipe with a sliding fit;

a mounting collar for holding said welding sleeve in place in the joint, comprising a ring-like body extending around one end of said welding sleeve and having an inside diameter approximately the same as the inside diameter of the sleeve, and a radially compressible annular flange on said body spaced outwardly from said sleeve by an amount approximately equal to the thickness of the socket element, one end of said welding sleeve being secured to said body in coaxial relation with said flange whereby said collar and said sleeve define an annular seat for receiving one end of the socket element;

an electrical socket on the outer side of said collar having electrical connectors for connection to a power source, said electrical heating coil having ends constituting electrical leads that extend from said sleeve into said collar and are connected to said electrical connectors; and a clamp ring extending loosely around said flange and including means for adjusting the size of the ring from a loose, released condition to a tightened, engaged position thereby to compress said flange around said joint and tighten the pipe and the socket element against said welding sleeve.

2. A welding seal assembly as defined in claim 1 further including detent means on said mounting collar for maintaining said clamp ring thereon in the loose, released condition during placement of said welding seal in a joint.

3. A welding seal assembly as defined in claim 2 wherein said detent means include outwardly extending tabs on said collar on opposite sides of said clamp ring.

4. A welding seal assembly as defined in claim 1 wherein said electrical socket comprises a tab that projects radially outwardly from said body on one side of said collar, and said electrical connectors are spaced, parallel tubes for receiving a pronged connector.

5. A welding seal assembly as defined in claim 4 further including outwardly extending detent means on said flange on the side of said clamp ring opposite said tab, whereby said clamp ring is held captive on said collar.

6. A welding seal assembly as defined in claim 1 wherein said flange is a thin-walled skirt of resiliently compressible material and is split at intervals around said collar for flexing upon tightening of said clamp ring.

7. A welding seal assembly as defined in claim 1 wherein said clamp ring is a metal strap having an inside diameter loosely fitting around said flange in the released condition, and said tightening means is an outwardly offset section of the strap having opposed, generally radial walls to be squeezed together to contract the strap to the engaged position.

8. A welding seal assembly as defined in claim 1 wherein said ring-like body has a beveled opening for admitting the pipe into the welding seal assembly, and an internal shoulder to which one end of said welding sleeve is joined.

9. For use in a joint comprising a pipe and a pipe socket loosely surrounding an end of the pipe, a welding seal assembly comprising:
    a collar having a ring-like body for extending around said pipe adjacent said pipe socket with a sliding fit, and an annular flange on said body extending around the outer side of said socket with a sliding fit, said flange being flexible for compression into tight engagement with the pipe socket;
    a welding sleeve having a tubular body composed of thermoplastic material, and a heating coil in said sleeve, to be disposed within the pipe socket, around the pipe;
    the body of said welding sleeve having one end that is joined to said ring-like body and supported inside and generally coaxial with said annular flange, thereby to define an annular seat for receiving the end of said socket;
    an electrical connector on said collar for connection to a power source, said heating coil having opposite end portions that extend from the body of said sleeve to said connector and are electrically connected thereto for heating of the coil to melt said sleeve within the joint; and
    a clamp extending around said flange and the joint, and having means thereon for tightening the clamp around the flange to squeeze the latter and the elements of the joint together.

10. A welding seal assembly as defined in claim 9 wherein said electrical connector comprises a radially projecting tab on said collar, and electrical contacts in said tab for receiving a pronged connector.

11. A welding seal assembly as defined in claim 9 wherein said flange is thin-walled and slotted for radial compressibility.

12. A welding seal assembly as defined in claim 9 wherein said collar has detent means thereon for holding and clamp captive thereon as the welding seal assembly is assembled onto a pipe socket.

13. A welding seal assembly as defined in claim 12 wherein said detent means include at least one outwardly projecting tab on said collar on each side of said clamp.

14. For use in a joint comprising inner and outer interfitting tubular elements, a welding seal assembly comprising:
    a collar having a ring-like body with an interior for receiving the inner element with a sliding fit, and having a flexible annular flange on one side of said body for receiving one end portion of the outer element;
    a tubular welding sleeve composed of thermoplastic material and including a heating element that is operable, when energized, to heat and melt the sleeve, said sleeve being spaced radially inwardly form said flange and joined at one end to said body, said sleeve having an interior that is sized to receive the inner element with a sliding fit;
    means on said collar connected to said heating element for connection to a source for energizing the latter and heating said sleeve;
    and means on said flange for compressing said flange around said interfitting tubular elements to press the latter and said sleeve tightly together.

15. A welding sleeve assembly for use in a joint comprising inner and outer interfitting tubular elements, comprising:
    a tubular welding sleeve composed of thermoplastic material and including a coil for heating said thermoplastic material, said sleeve being sized to be disposed between the two tubular elements; and a mounting collar for holding said sleeve in place between the elements, said collar being secured to one end of said sleeve in coaxial relation with the sleeve and including mounting means overlying said sleeve in radially spaced relation therewith to cooperate with the sleeve in defining a seat for receiving the end of the outer element.

16. A welding sleeve assembly as defined in claim 15 wherein said collar has a ring-like body and said mounting means comprise a plurality of flexible fingers extending from said body to overlie said sleeve.

17. A welding seal assembly as defined in claim 15 wherein said collar has a ring-like body and said mounting means comprise a thin-walled compressible flange on one side of said body disposed in spaced coaxial relation with said sleeve.

18. A welding seal assembly as defined in claim 15 wherein said collar has an electrical socket on its outer side, and said coil has electrical leads which extend through said collar to said socket.

19. A welding seal assembly as defined in claim 18 wherein said socket is formed in a radially projecting tab on said collar.

20. A welding seal assembly as defined in claim 15 wherein said mounting collar is a one-piece plastic molding with said ring-like body having an inner opening flush with the interior of said sleeve, said mounting means comprising a compressible annular plastic flange that is coaxial with said body and said sleeve.

21. A welding seal assembly as defined in claim 15 further including clamping means on said mounting collar loosely surrounding said mounting means for contracting the mounting means around the elements of the joint, and further including detent means for holding said clamping means captive on the collar in the loose condition.

22. A welding seal assembly as defined in claim 21 wherein said clamping means is a clamp ring encircling said mounting means and having means thereon for contracting the clamp ring when squeezed by pliers.

* * * * *